(12) United States Patent
De Block et al.

(10) Patent No.: US 8,191,201 B2
(45) Date of Patent: Jun. 5, 2012

(54) CONNECTION ELEMENT

(75) Inventors: Peter De Block, Halen (BE);
Klaus-Dieter Haefele, Budapest (HU);
Bart Fatan, Kermt (BE); Wilfried Merkel, Kappelrodeck (DE); Rudi Crabbé, Linter (BE); Paul Criel, St. Truiden (BE); Eric Windmolders, Kermt (BE); David Van Baelen, Winksele (BE)

(73) Assignee: Robert Bosch GmbH, Stuttgart (DE)

( * ) Notice: Subject to any disclaimer, the term of this patent is extended or adjusted under 35 U.S.C. 154(b) by 999 days.

(21) Appl. No.: 12/097,990

(22) PCT Filed: Oct. 31, 2006

(86) PCT No.: PCT/EP2006/067969
§ 371 (c)(1),
(2), (4) Date: Jul. 10, 2008

(87) PCT Pub. No.: WO2007/071487
PCT Pub. Date: Jun. 28, 2007

(65) Prior Publication Data
US 2008/0313841 A1    Dec. 25, 2008

(30) Foreign Application Priority Data

Dec. 19, 2005   (DE) .................. 10 2005 060 664

(51) Int. Cl.
*B60S 1/38*    (2006.01)
*B60S 1/40*    (2006.01)
(52) U.S. Cl. ............... 15/250.32; 15/250.43; 15/250.44

(58) Field of Classification Search ............... 15/250.43, 15/250.44, 250.451–250.454, 250.361, 250.31; B60S 1/40
See application file for complete search history.

(56) References Cited

U.S. PATENT DOCUMENTS
5,615,851 A    4/1997    LeBeau
(Continued)

FOREIGN PATENT DOCUMENTS
CN    1635964    7/2005
(Continued)

OTHER PUBLICATIONS
PCT/EP2006/067969 International Search Report.

*Primary Examiner* — Monica Carter
*Assistant Examiner* — Stephanie Newton
(74) *Attorney, Agent, or Firm* — Michael Best & Friedrich LLP

(57) ABSTRACT

The invention is based on a connection element (16, 44, 50, 66, 74, 80) for connecting a wiper blade (10), which has at least one spring rail (14) as a supporting element, to a wiper arm in an articulated manner, with the connection element (16, 44, 50, 66, 74, 80) having claws (22, 46, 52) which are integrally formed on the side of a base part (18) and, in the mounted state, surround and retain the spring rail (14) by the base part (18) being supported on a part of a wiper rubber (12) which is arranged between the spring rail (14) and the base part (18, 56, 68, 70). The invention proposes that the connection element (16, 44, 50, 66, 74, 80) has means (28, 58, 60, 68, 72, 76, 78, 82, 84) with which the surface pressure between the base part (18, 56, 68, 70) and the wiper rubber (12) is locally increased.

21 Claims, 5 Drawing Sheets

U.S. PATENT DOCUMENTS

| | | |
|---|---|---|
| 6,836,927 B2 | 1/2005 | De Block |
| 7,524,131 B2 | 4/2009 | Schwarz et al. |
| 2004/0240933 A1 | 12/2004 | Schwarz et al. |
| 2008/0034530 A1 | 2/2008 | Breesch |

FOREIGN PATENT DOCUMENTS

| | | | |
|---|---|---|---|
| DE | 19835065 | * | 2/2000 |
| DE | 19835065 A1 | | 2/2000 |
| DE | 202005012619 U | | 10/2005 |
| DE | 102004017941 A1 | | 11/2005 |
| DE | 102004019157 | | 11/2005 |
| EP | 1437273 A1 | | 7/2004 |
| FR | 2854852 A1 | | 11/2004 |
| JP | 2005297941 | | 10/2005 |
| WO | 00/07856 A2 | | 2/2000 |
| WO | 01/62559 A2 | | 8/2001 |
| WO | 0162559 | | 8/2001 |
| WO | 2005/102801 A1 | | 11/2005 |

* cited by examiner

CONNECTION ELEMENT

BACKGROUND OF THE INVENTION

The invention relates to a connection element.

DE 198 35 065 A1 has disclosed a wiper blade, in which a spring bar is inserted as loadbearing element in a central longitudinal channel of a top strip. A connection element having a joint pin is seated on the top strip, in order for it to be possible to connect the wiper blade to a wiper arm in an articulated manner. The connection element bears with a base part against the top strip of the wiper rubber and is held by four claws which are formed integrally on opposite longitudinal sides of the base part and surround the top strip with the spring bar laterally and from below. During mounting, the claws are bent around the top strip and pressed together, so that a non-positive connection results between the connection element and the top strip.

DE 10 2004 019 157 A1 has disclosed a wiper blade having two spring bars as loadbearing elements which are inserted into lateral longitudinal grooves of the wiper rubber. A sheet-metal claw which has a central web with a bearing hole comprises, with two continuous claws which are arranged on opposite longitudinal sides, those parts of the spring bars which protrude from the longitudinal grooves. During mounting, the claws which are formed integrally on a base part of the connection element are bent around the spring bars and pressed together firmly. In order to increase the friction between the spring elements and the claws, an intermediate layer of plastic is provided between the claw roots on one side and the spring bars on the other side. In other exemplary embodiments, different designs of the spring bars ensure that the connection element cannot be displaced in the longitudinal direction of the wiper blade.

SUMMARY OF THE INVENTION

According to the invention, the connection element has means, by means of which the surface pressure between the base part and the wiper rubber is increased locally. The local increase in the surface pressure in the region of the base part achieves secure seating of the connection element on the wiper blade, which seating is not loosened even after a relatively long service life. There is therefore always a secure position of the connection element in the longitudinal direction of the wiper blade, which is significant for the wiping properties and the vibration behavior of the wiper blade. Secured seating of the connection element is not ensured, in particular, when claws are supported directly on the spring bars. In these cases, it is particularly advantageous if the longitudinal fixing of the connection element is improved by a greater surface pressure between the base part and the adjacent wiper rubber.

However, in the case of wiper blades having a central spring, it is also advantageous to increase the surface pressure in the region of the base part locally. Although the claw roots are pressed to a pronounced extent into the lower region of the top strip of the wiper rubber, the pressure of the claws would have to be increased to such an extent, in order to generate an adequate surface pressure on the side of the base part, that damage of the wiper rubber is to be feared. As a result of the local increase in the surface pressure in the region of the base part, the fixing forces are distributed to a plurality of action points of the wiper blade, with the result that overloading at one point is not to be feared.

According to one refinement of the invention, it is proposed that the clamping part having a cam and a lever is mounted pivotably in side walls transversely with respect to the longitudinal direction of the connection element. The cam can be moved by means of the lever into a locking position, in which it presses onto the wiper rubber through a window in the base part. The lever is fixed in this position. The surface pressure in this region can be modified by the height of the cam. In order to lock the lever, the latter has a cutout on its free end side, in which cutout at least one latching projection is provided. The latter interacts with a notch on a lug which is formed integrally on the base part. It goes without saying that the method of operation can also be reversed, with the result that the notch is arranged on the lever and the latching projection is arranged on the lug.

In a further refinement of the invention, the connection element is a die cast part or an injection molded part which has in each case one continuous claw on both longitudinal sides. The local surface pressure in the region of the claws can be adapted as a result of the relatively long claws.

According to a further refinement of the invention, the base part forms bridges at its ends, on which bridges the claws are formed integrally. Clamping pieces which are pressed against the wiping rubber by wedges are arranged between the bridges and the wiper rubber. The magnitude of the local surface pressure can be modified by the shape of the clamping pieces and wedges. The wedges are expediently fixed in the end position, in order that they cannot be released during operation. For this purpose, the wedges have pawls which engage in latching holes in the bridges in the end position. The wedges and clamping pieces can be dismantled, and therefore likewise the connection element, by the pawls being pressed back.

One particularly simple embodiment results if the base part is bent toward the wiper rubber between its ends, with the result that an increased surface pressure is produced on the wiper rubber in the central region of the connection element, if the claws are bent around the loadbearing element or the loadbearing elements during mounting. The size and magnitude of the curvature largely determines the magnitude of the local surface pressure. It can therefore be sufficient for the base part to have a bead in the region of a joint axis, which bead extends transversely with respect to the longitudinal direction and is pressed into the wiper rubber in the mounted position.

According to a further refinement, the base part can have claws at its ends, which claws are bent in the direction of the wiper rubber during the mounting and engage with their hooks into the wiper rubber. The local surface pressure can be modified by the length and shape of the hooks in such a way that an optimum compromise is achieved between the holding force and the loading of the wiper rubber. The claws can be formed integrally in the longitudinal direction on the ends of the base part or can be notched in the base part in the end regions. Both possibilities result in only small additional costs during the production of the connection element.

BRIEF DESCRIPTION OF THE DRAWINGS

Further advantages result from the following description of the drawings. Exemplary embodiments of the invention are shown in the drawing. The drawing, the description and the claims contain a large number of features in combination. A person skilled in the art will also expediently consider the features individually and combine them to produce appropriate further combinations.

In the drawing.

DETAILED DESCRIPTION

Figure 1:
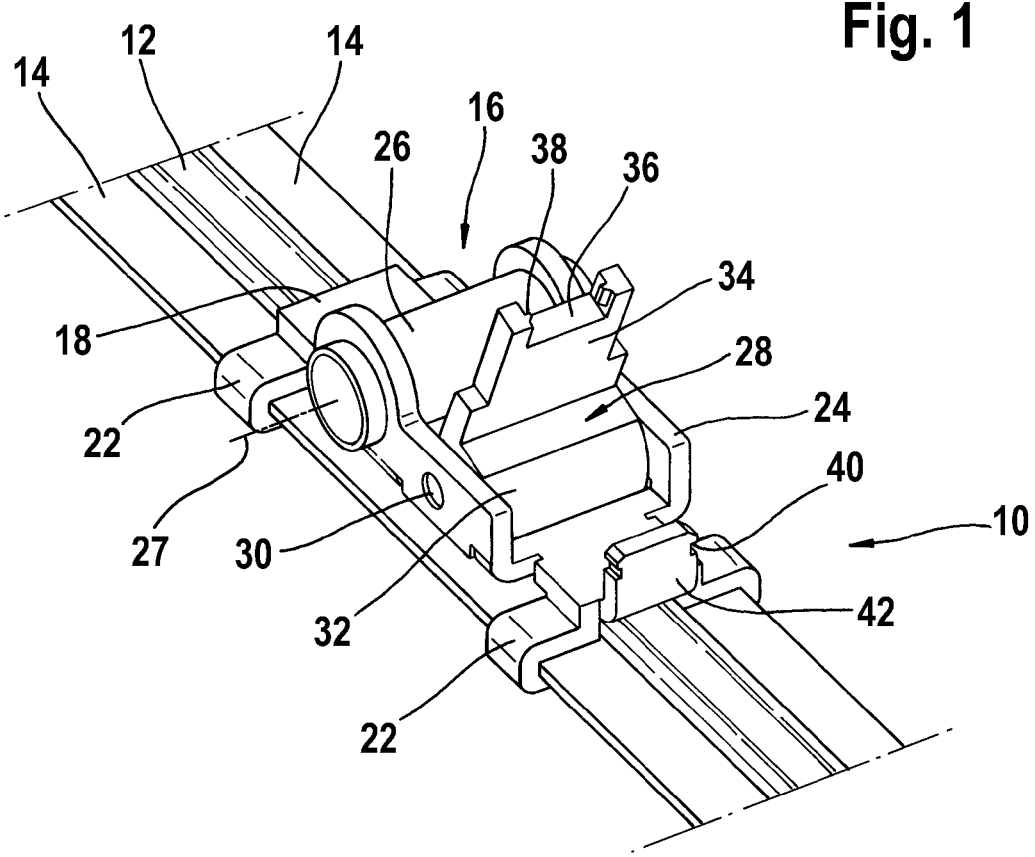
FIG. 1 shows a diagrammatic, perspective illustration of a connection element on a wiper blade, obliquely from above.

A wiper blade 10 having a wiper rubber 12 has two spring bars 14 which serve as loadbearing elements and are inserted into lateral longitudinal grooves of the wiper rubber 12. A connection element 16 which has a base part 18 and side walls 24 which are formed integrally on the latter is mounted on the wiper blade 10. Claws 22 which surround the spring bars 14 at the parts which protrude from the wiper rubber 12 are formed integrally on the base part 18 on the longitudinal sides.

The side walls 24 are connected to one another by a joint hub 26 which, together with a joint pin (not shown) of the wiper arm, forms a joint with a joint axis 27. In principle, the method of operation of the joint hub 26 and joint pin can be reversed, with the result that the side walls 24 are connected to one another by a joint pin and a joint hub 26 is provided on the wiper arm.

A clamping part 28 is mounted pivotably via bearing channels 30 in the side parts 24 parallel to the joint hub 26. The clamping part 28 comprises a cam 32 and a lever 34. The elevation of the cam 32 extends approximately perpendicularly with respect to the lever 34. By pivoting of the lever 34, the cam 32 moves through the window 20 in the base part 18 against the wiper rubber 12 and is pressed into the latter. The locally increased surface pressure with respect to the wiper rubber 12 results from the height and shape of the cam 32. The lever 34 is fixed in its end position. To this end, it has a cutout 36 at its free end face, in which cut-out 36 two latching projections 38 which lie opposite one another are arranged. The latter interact with notches 40 which are arranged on a lug 42. The lug 42 is formed integrally on the base part 18 in an extension of the latter and is angled away in the direction of the side walls 24.

Figure 2:
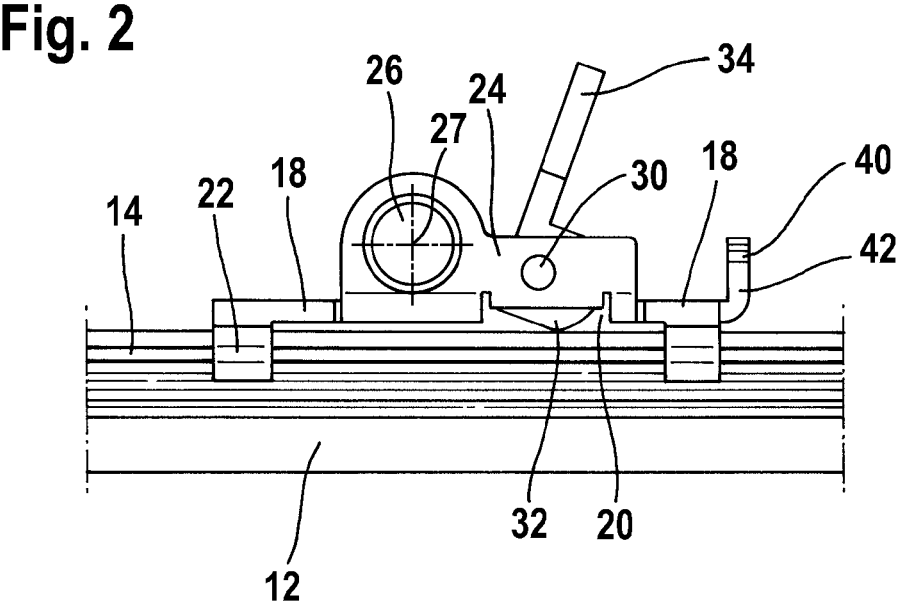
FIG. 2 shows a side view of a connection element according to FIG. 1, FIG. 3 and FIG. 4 show variants to FIG. 1.
Figure 3:
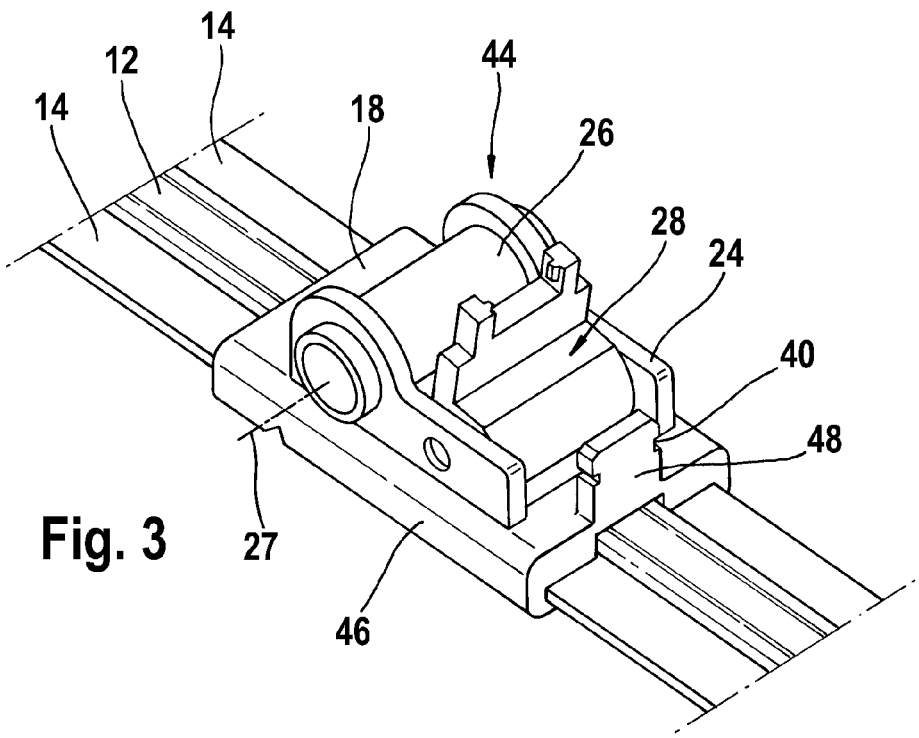

The connection element 44 according to FIG. 3 differs from the connection element 16 according to FIG. 1 and FIG. 2 in that it is produced as a die cast part or an injection molded part, and in that it has continuous claws 46 on both longitudinal sides. The connection element 44 is pushed onto the wiper blade 10 in the longitudinal direction and is fixed via the clamping part 28. The side walls 24, the lug 48, the base part 18 and the claws 46 are produced in a single manufacturing process.

Figure 4:
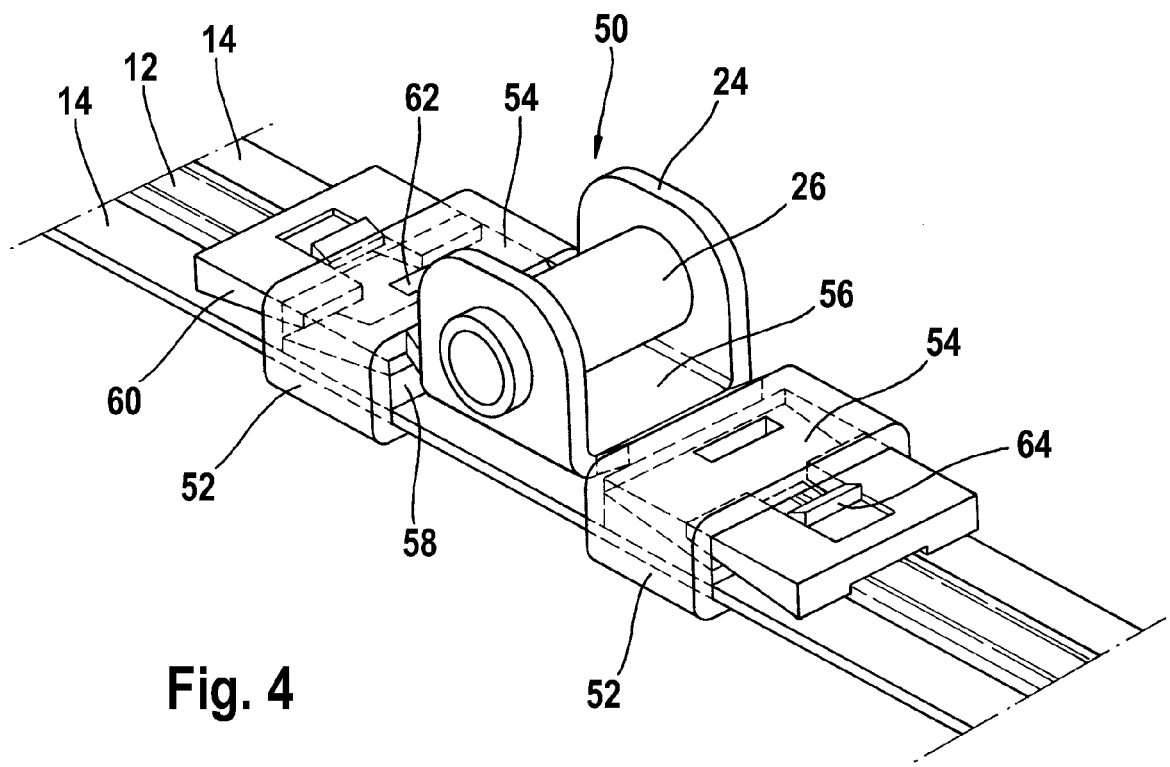
Figure 5:
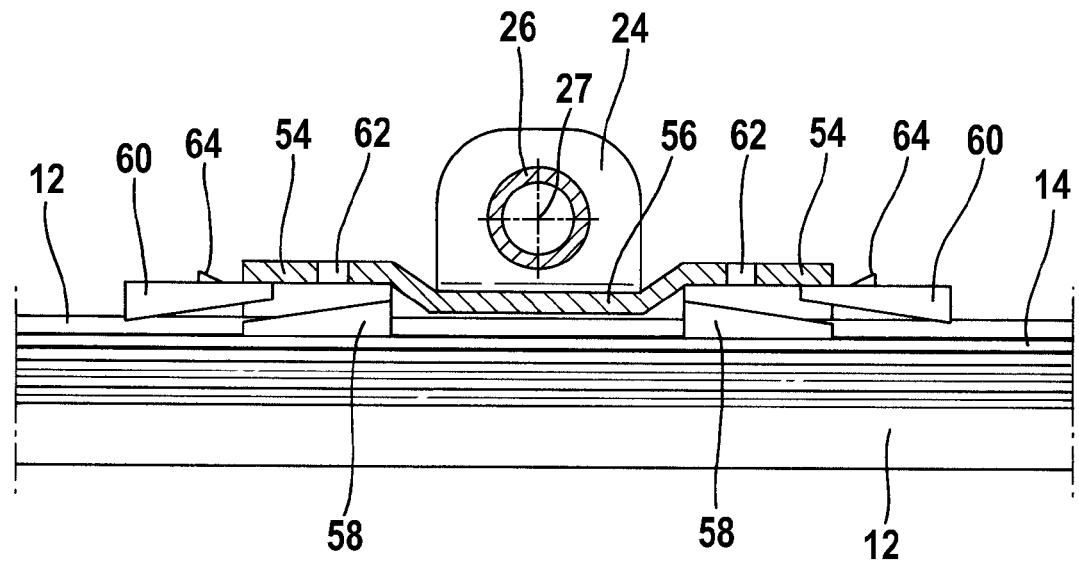
FIG. 5 shows a longitudinal section through a connection element according to FIG. 4.
Figure 6:
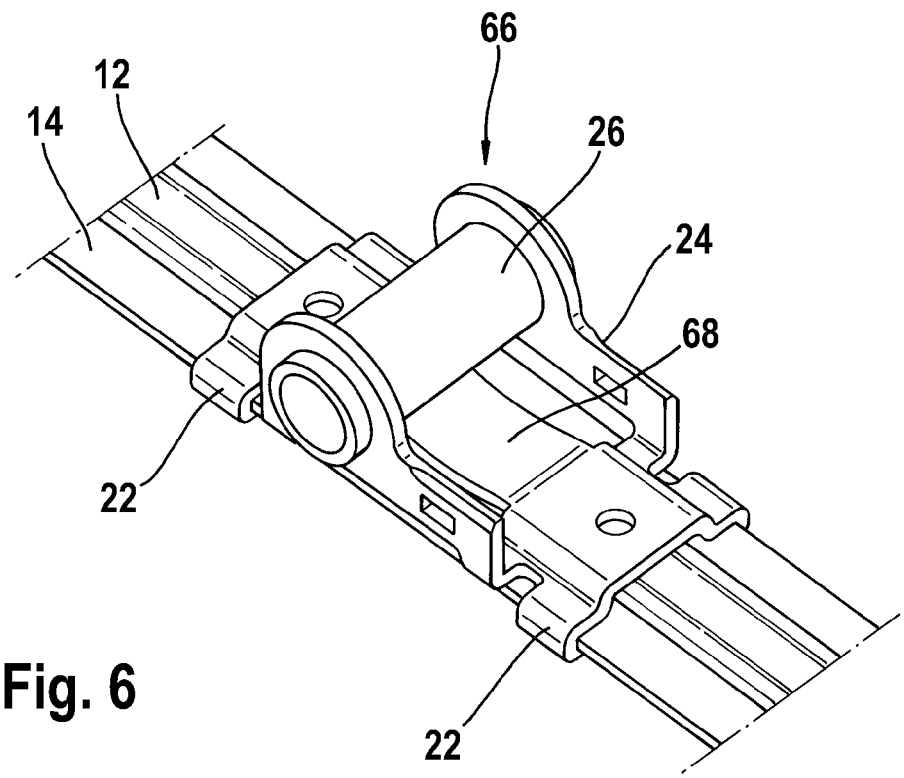
FIG. 6 shows a further variant to FIG. 1.

The connection element 50 according to FIG. 4 has a base part 56 which is configured as bridges 54 at its ends, on which bridges 54 claws 52 are formed integrally. Clamping pieces 58 which interact with wedges 60 are provided between the bridges 54 and the loadbearing elements 14 or the wiper rubber 12. These wedges 60 are supported on the inside of the bridges 54 and press the clamping pieces 58 against the wiper rubber 12, which results in a local increased surface pressure. The wedges 60 are fixed in the longitudinal direction by pawls 64 which latch into latching holes 62 of the bridges 54 in the end position of the wedges 60. The contact pressure against the wiper rubber 12 can be varied by the design of the clamping pieces 58 and the wedges 60.

Figure 7:
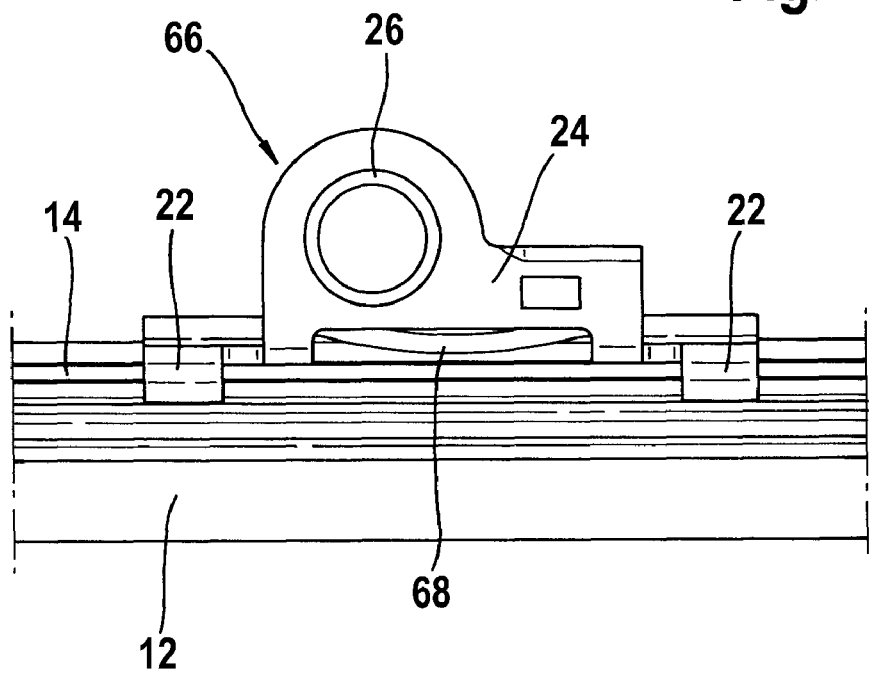
FIG. 7 shows a side view of a connection element according to FIG. 6.
Figure 8:
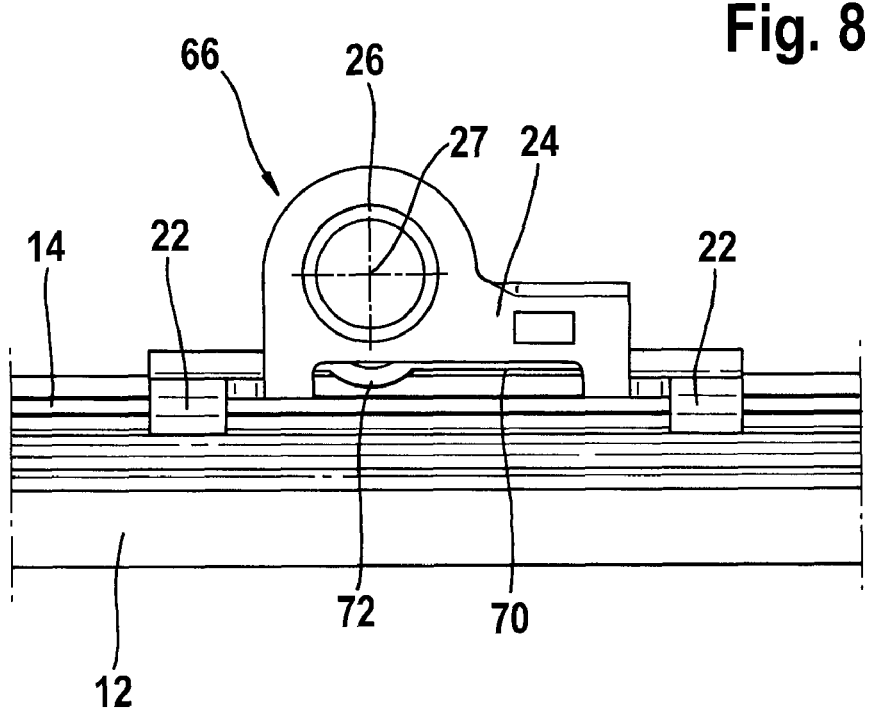
FIG. 8 shows a variant to FIG. 7.

The connection element 66 according to FIG. 7 has a base part 68 which is bent toward the wiper rubber 12 between its ends. The size of the bending radius and the magnitude of the curvature determine the magnitude of the local surface pressure. If the claws 22 are bent around the spring bars 14 during mounting and pressed together, the bent part of the base part 68 is pressed into the wiper rubber 12. In the variant according to FIG. 8, the base part 70 has a bead 72 which extends transversely with respect to the wiper blade 10 in the region of the joint axis 27. In comparison with the embodiment according to FIG. 7, the pressure forces in the embodiment according to FIG. 8 are concentrated on the relatively narrow region of the bead 72.

Figure 9:
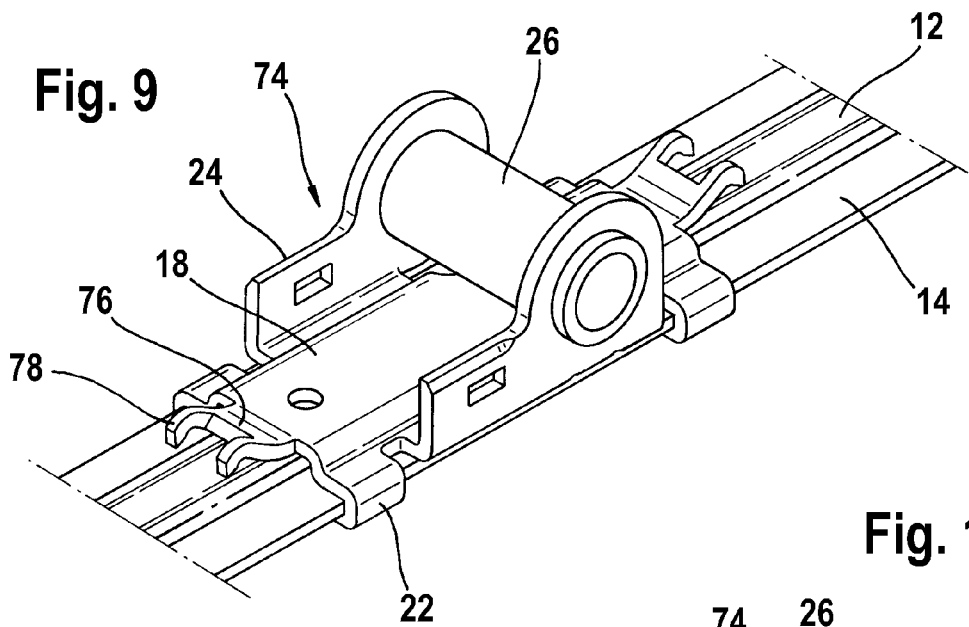
FIG. 9 shows a further variant to FIG. 1.
Figure 10:
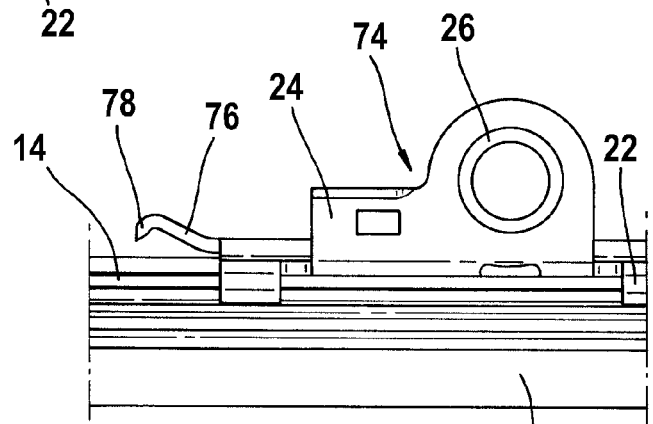
FIG. 10 shows a side view with respect to FIG. 1.
Figure 11:
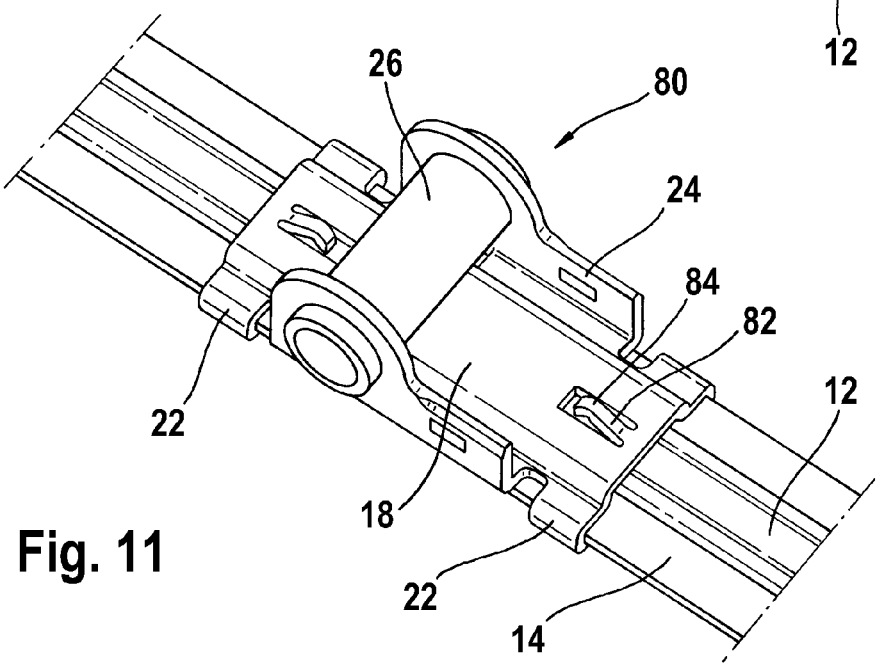
FIG. 11 shows a variant to FIG. 9.

The connection elements 74 and 80 according to FIG. 9 to FIG. 11 have claws 76, 82 which are formed integrally on the base part 18. Said claws 76, 82 are angled away slightly before mounting, with the result that the connection elements 74, 80 can be pushed over the wiper blade 10 in the longitudinal direction. In the final position of the connection elements 74, 80, the claws 76, 82 are pressed against the wiper rubber 12, their hooks 78, 84 engaging into the wiper rubber 12 and fixing the connection elements 74, 80 in the longitudinal direction. The connection element 74 differs from the connection element 80 in that the claws 76 point outward, starting from the end sides of the base part 18, and have in each case two hooks 78 which are arranged in parallel, while the connection element 80 has a claw 82 with in each case one hook 84 at each end, which are notched out of the base part 18 and point toward the joint hub 26. The local surface pressure toward the wiper rubber 12 can be modified and the holding force can be adapted to the requirements by the length and design of the hooks 78, 84.

The invention claimed is:

1. A connection element (16, 44, 50, 66, 74, 80) for the articulated connection of a wiper blade (10) having at least one spring bar (14) as a loadbearing element, to a wiper arm, the connection element (16, 44, 50, 66, 74, 80) comprising claws (22, 46, 52) which are integrally formed laterally on a base part (18) and surround and hold the spring bar (14) in the mounted state by the base part (18) being supported on a part of a wiper rubber (12) which is arranged between the spring bar (14) and the base part (18, 56, 68, 70), characterized in that the connection element (16, 44, 50, 66, 74, 80) has releasable means (28, 58, 60, 68, 72, 76, 78, 82, 84) engageable with an upper surface of the wiper rubber (12) by which a surface pressure between the base part (18, 56, 68, 70) and the wiper rubber (12) is selectively increased locally.

2. A connection element (16, 44, 50, 66, 74, 80) for the articulated connection of a wiper blade (10), having at least one spring bar (14) as a loadbearing element, to a wiper arm, the connection element (16, 44, 50, 66, 74, 80) comprising claws (22, 46, 52) which are integrally formed laterally on a base part (18) and surround and hold the spring bar (14) in the mounted state by the base part (18) being supported on a part of a wiper rubber (12) which is arranged between the spring bar (14) and the base part (18, 56, 68, 70), characterized in that the connection element (16, 44, 50, 66, 74, 80) has means (28, 58, 60, 68, 72, 76, 78, 82, 84) by which a surface pressure between the base part (18, 56, 68, 70) and the wiper rubber (12) is increased locally, and characterized in that a clamping part (28) having a cam (32) and a lever (34) is mounted pivotably in side walls (24) transversely with respect to the longitudinal direction of the connection element (16), the cam (32) being moved by means of the lever (34) into a locking position, in which it presses onto the wiper rubber (12) through a window (20) in the base part (18), and the lever (34) being fixed in this position.

3. The connection element as claimed in claim 2, characterized in that the lever (34) has a cutout (36) on its free end side, in which cutout (36) at least one latching projection (38) or a notch (40) is provided, the latching projection (38) interacting with at least one notch (40) or the notch (40) interacting with a latching projection (38) on a lug (42) which is formed integrally on the base part (18).

4. The connection element as claimed in claim 1, characterized in that the connection element is one of a die cast part and an injection-molded part.

5. The connection element as claimed in claim 3, characterized in that the connection element has in each case one continuous claw (46) on both longitudinal sides.

6. The connection element (50) as claimed in claim 1, characterized in that the base part (56) forms bridges (54) at its ends, on which bridges (54) the claws (52) are formed integrally, clamping pieces (58) which are pressed against the wiper rubber (12) by wedges (60) being arranged between the bridges (54) and the wiper rubber (12).

7. The connection element (50) as claimed in claim 6, characterized in that the wedges (60) have pawls (64) which engage in latching holes (62) in the bridges (54) in their end position.

8. The connection element (66) as claimed in claim 1, characterized in that the base part (68) is bent toward the wiper rubber (12) between its ends, with the result that an increased surface pressure is produced on the wiper rubber (12) in the central region of the connection element (66).

9. The connection element (66) as claimed in claim 8, characterized in that the base part (70) has, in the region of a joint axis (27), a bead (72) which extends transversely with respect to the longitudinal direction and is pressed into the wiper rubber (12) in the mounted position.

10. The connection element (74) as claimed in claim 1, characterized in that, at ends of the connection element, the base part (18) has claws (76) which point to the outside, are bent in the direction of the wiper rubber (12) during the mounting and engage with their hooks (78) into the wiper rubber (12).

11. The connection element (80) as claimed in claim 1, characterized in that, in end regions of the connection element, claws (82) which are pressed against the wiper rubber (12) during mounting are notched in the base part (18), with the result that their hooks (84) engage into the wiper rubber (12).

12. The connection element as claimed in claim 2, characterized in that the connection element is one of a die cast part and an injection-molded part.

13. The connection element as claimed in claim 2, characterized in that the connection element has in each case one continuous claw (46) on both longitudinal sides.

14. A connection element (16, 44, 50, 66, 74, 80) for the articulated connection of a wiper blade (10), having at least one spring bar (14) as a loadbearing element, to a wiper arm, the connection element (16, 44, 50, 66, 74, 80) comprising claws (22, 46, 52) which are integrally formed laterally on a base part (18) and surround and hold the spring bar (14) in the mounted state by the base part (18) being supported on a part of a wiper rubber (12) which is arranged between the spring bar (14) and the base part (18, 56, 68, 70), characterized in that the connection element (16, 44, 50, 66, 74, 80) has means (28, 58, 60, 68, 72, 76, 78, 82, 84) by which a surface pressure between the base part (18, 56, 68, 70) and the wiper rubber (12) is increased locally, and characterized in that the means includes a clamping part (28) having a cam (32) and a lever (34) mounted pivotably on the base part (18), the cam (32) being moved by the lever (34) into a locking position, in which the cam (32) presses onto the wiper rubber (12).

15. The connection element as claimed in claim 14, characterized in that the cam (32) and the lever (34) are mounted pivotably in side walls (24) transversely with respect to the longitudinal direction of the connection element (16).

16. The connection element as claimed in claim 14, characterized in that, in the locking position, the cam (32) presses onto the wiper rubber (12) through a window (20) in the base part (18).

17. The connection element as claimed in claim 14, characterized in that the lever (34) being fixed in a position corresponding to the locking position of the cam (32).

18. The connection element as claimed in claim 17, characterized in that the lever (34) has a cutout (36) on its free end side, the cutout (36) having one of a latching projection (38) and a notch (40), and characterized in that a lug (42) provided on the base part (18), the lug (42) having the other of a latching projection (38) and a notch (40) interacting with the one of a latching projection (38) and a notch (40) on the cutout (36) to fix the lever (34) in the position.

19. The connection element as claimed in claim 14, characterized in that the connection element is one of a die cast part and an injection-molded part.

20. The connection element as claimed in claim 3, characterized in that the connection element has in each case one continuous claw (46) on both longitudinal sides.

21. The connection element as claimed in claim 1, characterized in that the claws (22, 46, 52) directly engage the spring bar (14).

* * * * *